United States Patent [19]
Ide et al.

[11] Patent Number: 5,260,920
[45] Date of Patent: Nov. 9, 1993

[54] ACOUSTIC SPACE REPRODUCTION METHOD, SOUND RECORDING DEVICE AND SOUND RECORDING MEDIUM

[75] Inventors: Hiroaki Ide; Hidefumi Nagai, both of Hamamatsu, Japan

[73] Assignee: Yamaha Corporation, Hamamatsu, Japan

[21] Appl. No.: 717,278

[22] Filed: Jun. 18, 1991

[30] Foreign Application Priority Data

Jun. 19, 1990 [JP] Japan ................... 2-160573

[51] Int. Cl.⁵ .................. H04B 1/20; H03G 3/00
[52] U.S. Cl. ........................... 369/5; 381/63; 381/83
[58] Field of Search .............. 369/5, 1, 4, 86, 87; 381/64, 65, 82, 83, 97, 96, 93, 17, 62, 63; 84/DIG. 26

[56] References Cited

U.S. PATENT DOCUMENTS

| | | | |
|---|---|---|---|
| 2,844,663 | 7/1958 | Friess | 369/5 |
| 3,614,320 | 10/1971 | Volkmann | 381/64 X |
| 4,649,564 | 3/1987 | Bornett | 381/63 |
| 5,119,428 | 6/1992 | Prinssen | 381/83 |

*Primary Examiner*—Steven Mottola
*Assistant Examiner*—Ali Neyzari
*Attorney, Agent, or Firm*—Spensley Horn Jubas & Lubitz

[57] ABSTRACT

A system for reproducing a sound field simulating a real acousting space includes a sound collecting device, a sound recording device and a sound reproducing device. The sound collecting device includes first and second collection systems, the first collection system having non-directional microphones at respective corners of a cube defining a hypothetical three-dimensional space in the real acoustic space and the second collection system having directional microphones of the same number as the non-directional microphones concentrically within the three-dimensional space with directivity of each of the directional microphones being set in the direction of one of the non-directional microphones with which the directional microphone constitutes a pair. Collected sounds by the first and second collection systems of the sound collection device are mixed with each other and recorded on a recording medium by the sound recording device, and further provided on the sound reproducing device. The sound reproducing device has plural loudspeakers of the same number as the non-directional microphones in positions corresponding to the non-directional microphones in the three-dimensional space, and reproduces the collected sounds from the loudspeakers.

11 Claims, 4 Drawing Sheets

ACOUSTIC SPACE REPRODUCTION METHOD, SOUND RECORDING DEVICE AND SOUND RECORDING MEDIUM

BACKGROUND OF THE INVENTION

This invention relates to a method of reproducing collected sound of an acoustic space and thereby reproducing a sound field simulating the acoustic space, a sound recording device for recording sound collected by said method, as well as a sound recording medium on which the collected sound is recorded; designed for reproducing a sound field which simulates a natural sound field more closely than one produced by prior art methods.

As a method for reproducing sound of an acoustic space collected by microphones in a listening room and reproducing a sound field simulating the acoustic space, there was such method in the prior art, for example, as described in Japanese Patent Publication No. 1-37080 entitled "Decoder for reproducing a sound" (corresponding to GB application No. 13292/74). According to this method, sound is reproduced by producing simulated sounds in three directions from three signals which have information in horizontal (right and left directions) and vertical directions respectively, and reproducing them through eight loudspeakers installed at eight corners of a cubic space such as a listening room.

In another prior art method, sound is collected with microphones of a three-dimensional sound collection system, and reproduced through the same number of loudspeakers as the microphones and arranged in corresponding positions. As the sound collecting system of this method, non-directional microphones are arranged in three dimensions or directional microphones are arranged concentrically.

The reproduction of the three-dimensional sound field by simulated sounds in the first described method, however, is nothing more than a simulated three-dimensional sound field provided by electrical signal processing such as filtering and phase shift processing. Therefore, the sound inevitably becomes unnatural. Moreover, the sound field reproduced with simulated reflected sound consisting of reflected sound components is a closed space such as a room or a hall, and is not a real or natural space such as an outdoor space.

Also, in the method where sound is collected by the microphones of the three-dimensional sound collecting system and reproduced through the loudspeakers arranged in corresponding positions, in a case where the non-directional microphones are arranged in three dimensions in the three-dimensional sound collection system, sound containing information of all directions is reproduced through all loudspeakers. This method, therefore, can express space characteristics, or feeling of scale, but it has the defect that the direction of sound is unclear and, therefore, the sound becomes unclear.

Also, in the prior art three-dimensional sound collection system, in a case where the directional microphones are also arranged in three dimensions with each microphone facing outside, there is no information inside of the cubic space, so that it gives the impression that there is no sound inside.

In a case where the directional microphones are arranged concentrically in the three-dimensional sound collection system, it can collect direct sound from every direction, and the direction of the sound can be clear. It, however, has the defect that the space characteristics become unnatural. That is, it gives the impression that the sound field was extended.

Accordingly, it is an object of the present invention to eliminate the above defects of the prior art methods and provide a method for reproducing an acoustic space, a sound recording device and a sound recording medium capable of reproducing more naturally and vividly such three-dimensional sound fields including natural spaces such as forests and the sea as well as man-made spaces such as streets and halls.

SUMMARY OF THE INVENTION

For achieving the above described object, a method of reproducing an acoustic space according to the invention comprises providing, in an acoustic space from which sounds are to be recorded, first sound collection means comprising plural non-directional microphones disposed in a hypothetical three-dimensional space of a sound collection system having a predetermined size, and second sound collection means comprising plural directional microphones of the same number as the non-directional microphones of the first sound collection means disposed concentrically inside of the hypothetical three-dimensional space of the sound collection system. The directivity of each of the directional microphones is set in the direction of one of the non-directional microphones with which said directional microphone constitutes a pair. The method includes collecting sounds in the acoustic space by the microphones of the first and second sound collection means, and providing reproduction means comprising loudspeakers of the same number as the non-directional microphones of the first sound collection means disposed in positions corresponding to the non-directional microphones in a three-dimensional space of a reproduction system which is substantially similar to the hypothetical three-dimensional space defined by the first sound collection means. The method still further includes mixing a sound collection signal from each of the non-directional microphones of the first sound collection means with a sound collection signal from one of the directional microphones of the second sound collection means with which said non-directional microphone of the first sound collection means constitutes a pair, and reproducing the mixed signal from one of the loudspeakers corresponding to said non-directional microphone.

According to the method of reproducing an acoustic space of the present invention, sound is collected by the first sound collection means and the second sound collection means and mixed together to be reproduced through each loudspeaker of the reproduction means. Accordingly, sound is collected by both the first sound collection means in which the non-directional microphones are arranged in three dimensions, and the second sound collection means in which the directional microphones are arranged concentrically, and they are then mixed together and, therefore, space characteristics, i.e., the feeling of scale, are obtained by the first sound collecting means while the direction of sound is also obtained by the second sound collection means. Thus, a vivid sound field can be reproduced. Particularly, since the microphones of the second sound collection means are provided in the same number as those of the first sound collection means, and since directivity of each microphone of the second sound collection means is set in the direction of the microphone of the first sound collection means with which it constitutes a pair, there is harmonization between the space characteristics and the direction of the sound of the mixed signals whereby a natural sound field can be obtained.

For achieving the above object, a sound recording device according to the invention comprises first sound collection means comprising plural non-directional microphones disposed in a hypothetical three-dimensional space of a sound collection system having a predetermined size, and second sound collection means comprising plural directional microphones of the same number as the non-directional microphones of the first sound collection means disposed concentrically inside of the hypothetical three-dimensional space of the sound collection system. Directivity of each of the directional microphones is set in the direction of one of the non-directional microphones with which said directional microphone constitutes a pair. The sound recording devices include mixing means for mixing a sound collection signal from each of the non-directional microphones of the first sound collection means with a sound collection signal from one of the directional microphones of the second sound collection means with which said non-directional microphone of the first sound collection means constitutes a pair, and recording means for recording the mixed signal.

According to the sound recording device of the present invention, signals collected and mixed by the first and the second sound collection means can be recorded separately by the recording means. Accordingly, the sound field can be reproduced by reproducing the signals with the reproducing device and sounding them through each loudspeaker of the reproduction means.

For achieving the object of the invention, a sound recording medium according to the invention contains sound signals which are recorded on multiple tracks. Said sound signals are obtained by collecting sounds to be recorded from an acoustic space by respective microphones of first sound collection means comprising plural non-directional microphones disposed in a hypothetical three-dimensional space of a sound collection means of a sound collection system having a predetermined size, and second sound collection means comprising plural directional microphones of the same number as the non-directional microphones of the first sound collection means disposed concentrically inside of the hypothetical three-dimensional space of the sound collection system. Directivity of each of the directional microphones is set in the direction of one of the non-directional microphones with which said directional microphone constitutes a pair. A sound collection signal from each of the non-directional microphones of the first sound collection means is mixed with a sound collection signal from one of the directional microphones of the second sound collection means with which said non-directional microphone of the first sound collection means constitutes a pair.

According to the sound recording medium of the present invention, as the sound collected by the first and the second sound collection means is recorded in the medium, the sound field can be reproduced by reproducing the sound with the reproduction means and sounding it through each loudspeaker of the reproduction means.

Preferred embodiments of the invention will be described below with reference to the accompanying drawings.

BRIEF DESCRIPTION OF THE DRAWINGS

In the accompanying drawings.

DESCRIPTION OF PREFERRED EMBODIMENTS

An embodiment of this invention will now be described.

Figure 1:
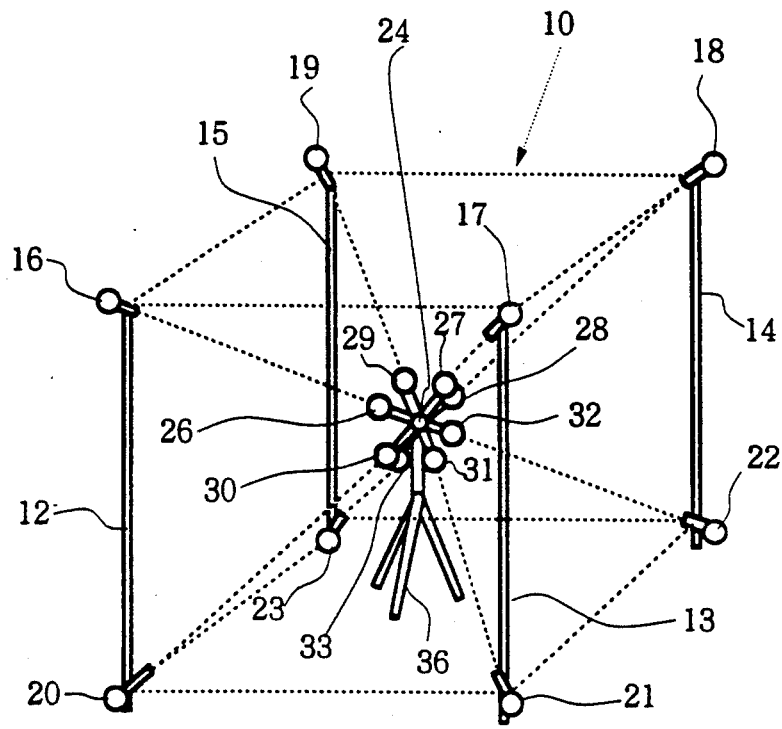
FIG. 1 is a perspective view showing an example of a sound collection system of this invention.

FIG. 1 shows an example of construction of the three-dimensional sound collection system according to this invention. Recording can be made in any real space. Any natural sound or music can be an object of recording.

As the sound collection system, a hypothetical three-dimensional space 10, e.g., a cube, which has a predetermined size is assumed to exist in a place where sound is to be collected. The size of the three-dimensional space 10 can be determined, e.g., at 3 m in depth, 3 m in width and 2.5 m in height.

Along the four vertical edges of the three-dimensional space, microphone stands 12 to 15 are set upright. At respective corners of the three-dimensional space 10 corresponding to the top and bottom of the respective microphone stands 12 to 15, non-directional microphones 16 to 23 are three-dimensionally installed, thereby constituting the first sound collection means. Each of the microphones 16 to 23 is installed facing outwardly, substantially on a hypothetical line extending from a center 24 of the three-dimensional space 10.

At about the center 24, directional microphones 26 to 33, whose number is the same as the non-directional microphones 16 to 23, are concentrically provided on a tripod 36, constituting the second sound collection means. These directional microphones 26 to 33 constitute pairs respectively with the corresponding non-directional microphones 16 to 23 arranged in the same direction, with directivity of each directional microphones being set in the direction of the non-directional microphone with which it constitutes a pair, thereby covering the entire three-dimensional angle.

According to the construction of the sound collection system of FIG. 1, the space characteristics, i.e., the feeling of scale, can be obtained with the non-directional microphones 16 to 23, (the first sound collection means). Particularly, as these non-directional microphones are arranged facing outwardly, sound information outside of the three-dimensional space 10 can be sufficiently obtained and, therefore, abundant space characteristics can be obtained. Also, the direction of sound can be obtained with the directional microphones 26 to 33 constituting the second sound collection means. With the directional microphones 26 to 33, sound information within the three-dimensional space 10, which cannot be collected sufficiently by the non-directional microphones 16 to 23 facing outwardly, can be fully obtained. Moreover, as the non-directional microphones 16 to 23 are arranged in the direction of the directional microphones 26 to 33 with which they constitute pairs, when sound signals collected by microphones constituting a pair with each other are mixed together, the space characteristics and the direction of sound can be harmonized, whereby a sound giving the impression of a natural sound can be obtained.

Figure 2:
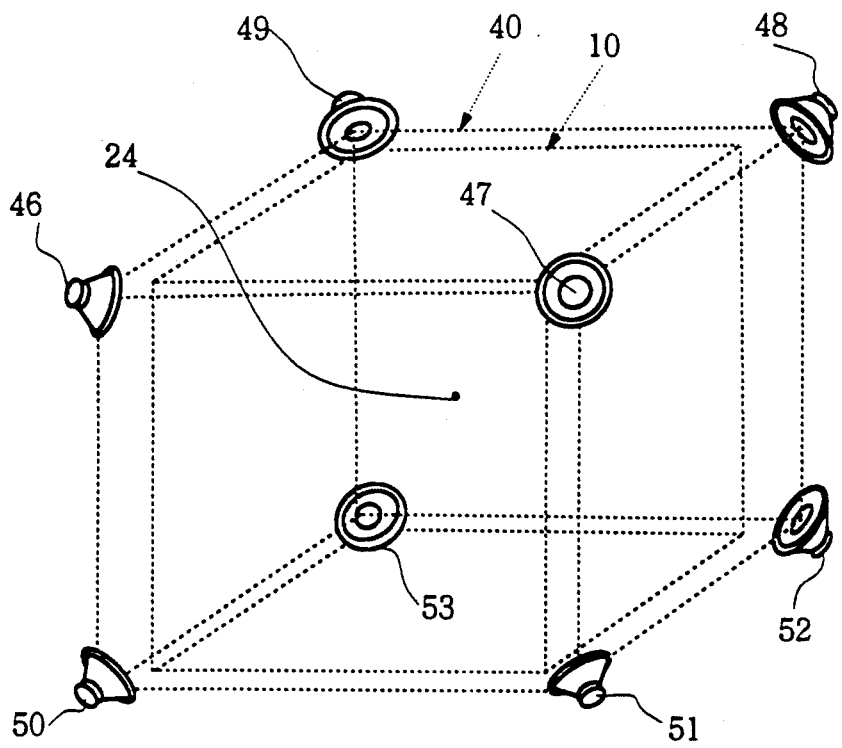
FIG. 2 is a perspective view showing an example of a reproduction system in this invention.

FIG. 2 shows an example of construction of the sound reproduction system according to the invention. As the sound reproduction system, a three-dimensional space 40 which is substantially similar to the assumed three-dimensional space 10 of the sound collection system is assumed to exist. As the three-dimensional space 40 of the sound reproduction system, a room, e.g., a listening room, can be used. In the case of using a larger space, like halls or an outdoor space, the entire space can be used by zoning a determined space or ignoring the capacity of the space. In this case, it has been proved that the feeling of reality is increased, if the scale of the three-dimensional space 40 of the sound reproduction system is equal to or larger than that of the three-dimensional space 10 of the sound collection system.

At corners of the three-dimensional space 40 of the sound reproduction system, loudspeakers 46 to 53 of the same number as that of the non-directional microphones 16 to 23 of the first sound collection means and that of the directional microphones 26 to 33 of the second sound collection means with which they constitute pairs are provided. In the case that these loudspeakers 46 to 53 are directional, their directivity should be set in the direction of the center 24 of the three-dimensional spaces 10 and 40. In the case that they are non-directional, their direction may be freely set. For example, they may be arranged so that their sound propagating surfaces are directed inwardly of the three-dimensional space 40. When the directivity of the loudspeakers 46 to 53 have at least a three-dimensional angle covering the whole of the three-dimensional space 40, the sound field of actual scale can be experienced wherever in the space 40 the listener may be located.

Figure 3:
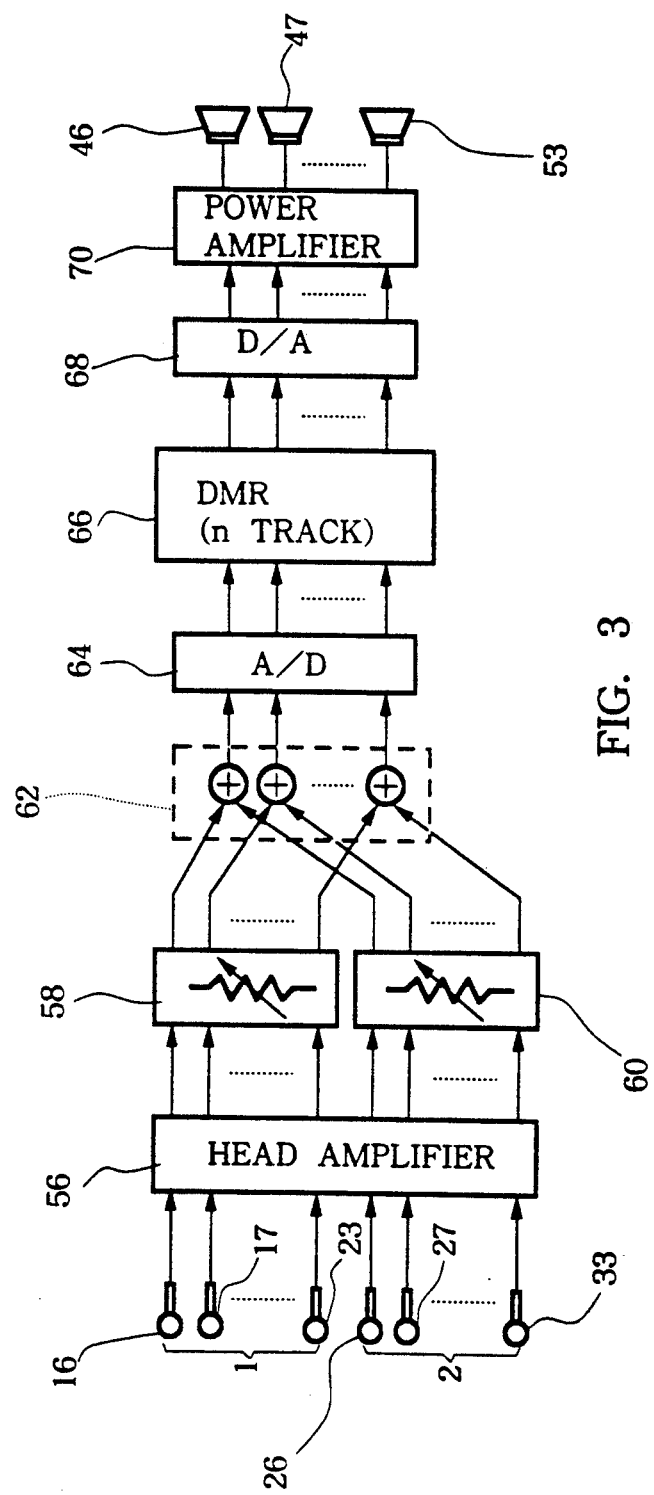
FIG. 3 is a block diagram showing an example of a signal processing system used in the sound collection system of FIG. 1 and the reproduction system of FIG. 2.

FIG. 3 shows an example of construction of the signal processing system. Fairs of sound collection signals of the non-directional microphones 16 to 23 constituting first sound collection means 1 and those of the directional microphones 26 to 33 constituting second sound collection means 2, which have been adjusted appropriately in their level by attenuators 58 and 60 through a head amplifier 56, are added and mixed together by an adder 62.

An output of the adder 62 is converted to a digital signal in an A/D converter 64, and thereafter is applied to a DMR (digital multi-track tape recorder) 66, constituting the recording means of this invention. The DMR 66 which has at least as many tracks as the number of input signals n (in this embodiment, n=8) records each input signal in one of the tracks corresponding to the respective loudspeakers 46 to 53 after having applied such digital processing as effect imparting and level adjustment to the input signal, if necessary. In this way, the sound recording medium of the present embodiment is produced in the form of a magnetic tape. It may be preserved as a master tape.

In the case of reproduction, the magnetic tape, on which sound information is recorded as described above, is set in the DMR 66. A reproduced signal of each track is converted to an analog signal by a D/A converter 68, supplied to a corresponding one of the loudspeakers 46 to 53 through a power amplifier 70, and propagated therefrom as a sound. Since space characteristics of the reproduced signal are expressed by the sound recorded by the first sound collection means 1, and its direction expressed by the sound recorded by the second sound collection means 2, and also since these sounds recorded by the first and second sound collection means 1 and 2 are reproduced by mixing a pair of sounds in the corresponding positions, the sound can be reproduced with its space characteristics and direction of sound being harmonized, and with natural and realistic impression in another space. No special mixing processing is required in the processes from recording to reproducing.

If, as described above, the scale of the three-dimensional space of the reproduction system 40 is equal to or larger than that of the three-dimensional space 10 of the sound collection system, the feeling of reality can be increased. According to experiments, when recording was made with the three-dimensional space 10 of the sound collection system being determined, as its length, width and height at 3 m, 3 m and 2.5 m respectively, and reproduction was made with the three-dimensional space 40 of the reproduction system being determined, as its length, width and height, at 7 m, 7 m and 2.5 m respectively as a small music hall, it neither gave the impression that there was no sound inside, nor reduced the space characteristics, but it proved to increase the feeling of reality.

In this case, a desirable listening area in the three-dimensional space 40 of the reproduction system, i.e., the small music hall, is provided when all sounds from the loudspeakers 46 to 53 can be heard without being masked by the sound of the nearest loudspeaker. The sound field can be experienced at any place if the interval between each audience seat and the loudspeakers 46 to 53 is not too close.

In the case where the size of the three-dimensional space 40 of the reproduction system was set at the length of 15 m, width of 7 m and height of 2.5 m, it exceeded the service area of the loudspeakers 46 to 53 and the sound of the nearest loudspeaker was mostly heard, so that the concentrated feeling of space was reduced. However, it was verified that installation of the system in the space was natural and gave an effect of a kind of environmental sound.

Figure 4:
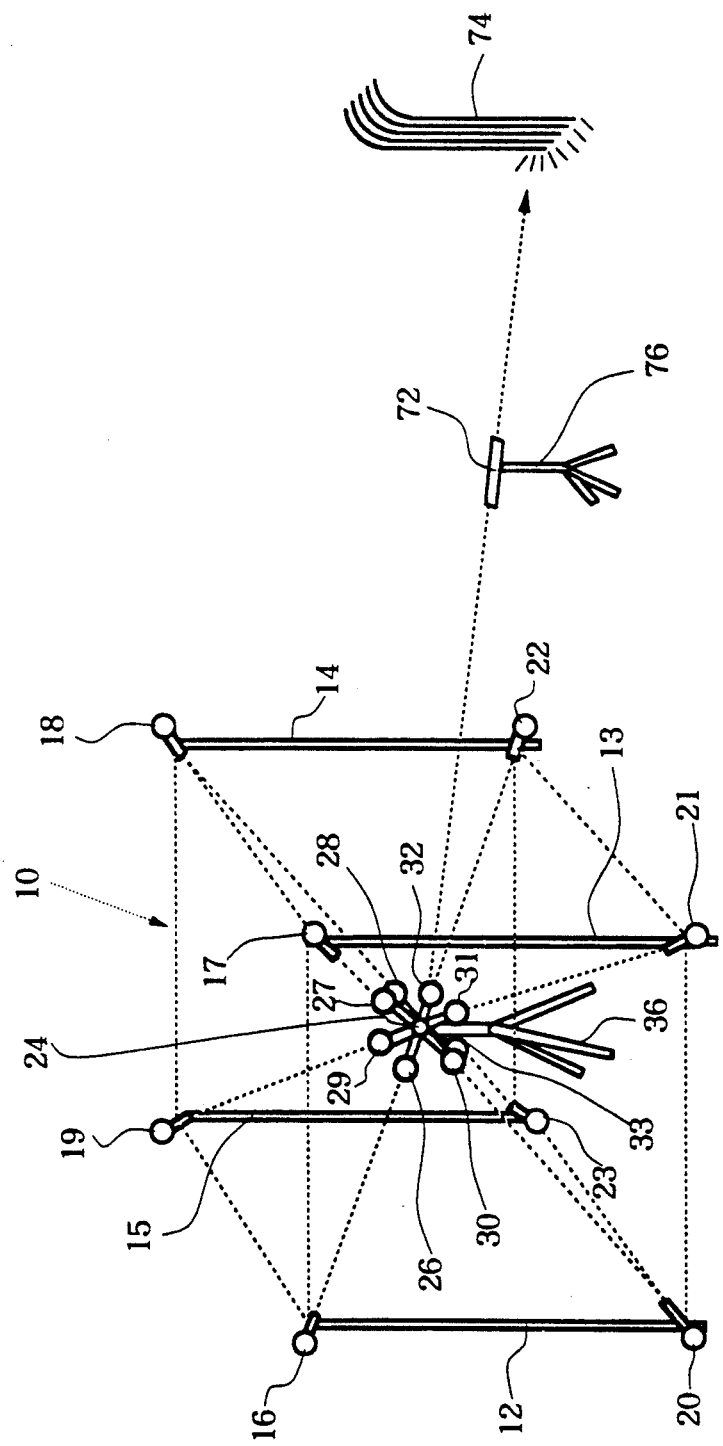
FIG. 4 is a perspective view showing another example of the sound collection system of this invention.

An example of construction of a three-dimensional sound collection system according to this invention, provided additionally with a spot sound recording function, is shown in FIG. 4. In FIG. 4, the non-directional microphones 16 to 23, which constitute the first sound collection means, and the directional microphones 26 to 33, which constitute the second sound collection means, are arranged in the same way as those of FIG. 1. In this example, a mono-directional microphone 72 is added for recording spot sounds.

The mono-directional microphone 72 records a special, remarkable sound, i.e., a spot sound, simultaneously with recording of this sound by the other microphones 16 to 23. Although such spot sounds become unclear and difficult to distinguish from other sounds of the acoustic space sufficiently when they are recorded and reproduced by only the microphones 16 to 23 and 26 to 33, they can become clear by mixing them. A masking effect for the ear can thereby be produced and spot sounds and space sounds can be selectively heard as desired by the listener. Also, they can be reproduced in accordance with the environment, whereby an accurate sound environment can be created.

The example of FIG. 4 shows a case where a sound of a fall 74 is collected and recorded as a spot sound. On the hypothetical straight line from the center 24 of the three-dimensional space 10 of the sound collection means to a sound source position of the fall 74, the mono-directional microphone 72 is installed to collect the spot sound. In this case, the sound source position of the spot sound, i.e. the position of the fall 74, is set on the extended line from an intermediate position between the microphones 17 and 18.

Figure 5:
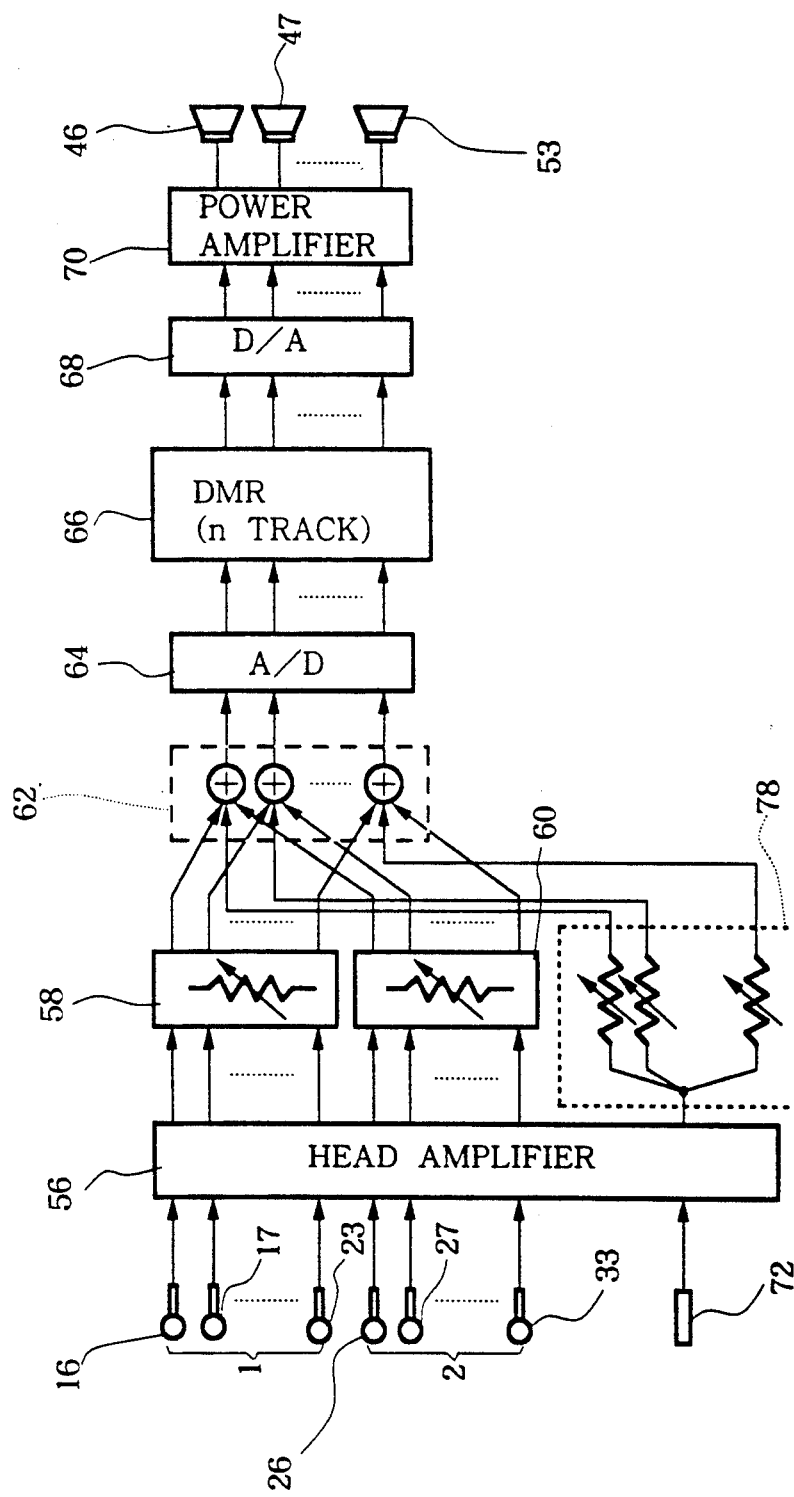
FIG. 5 is a block diagram showing an example of the signal processing system used in the sound collection system of FIG. 4 and the reproduction system of FIG. 2.

FIG. 5 shows the signal processing system in which the sound collection system of FIG. 4 is used. The processing system of the sound collection signal of the microphones 16 to 23 and 26 to 33 is the same as that of the system shown in FIG. 3. In the system of FIG. 5, pairs of the sound collection signals are added in the adder 62 through the head amplifier 56 and attenuators 58 and 60.

The sound collection signal of the mono-directional microphone 72 is divided by a divider 78 through the head amplifier 56. The divider 78 gives direction to the spot sound by dividing an input signal, and the divided signals are supplied to the adder 62 to be added to and mixed with the corresponding sound collection signals respectively. Here, they are divided in level in accordance with the distance between the spot sound source and the microphones 18, 19, 22, 23, 16, 17, 20 and 21. In this way, a level adjustment is made in such a manner that, during reproduction, the spot sound can be heard as if it was coming from the real sound source.

The output of the adder 62 is converted by the A/D converter 64 to a digital signal, and applied to each track of the DMR 66 and recorded therein. During reproduction, the reproduced output of each track of the DMR 66 is converted by the D/A converter 68 to an analog signal and supplied through the power amplifier 70 to the respective loudspeakers 46 to 53 of FIG. 2 and propagated therefrom as a sound.

In this way, the spot sounds become clear, and by the masking effect for the ear, a micro sound, i.e. the spot sound, and a macro sound, i.e. the space sound, can be selectively heard, and an accurate sound environment can thereby be created.

Moreover, a space which produces a more positive psychological effect can be created by combining many spot sounds collected from various directions, or combining some space sounds of various places collected by the three-dimensional sound collection system, or collecting sounds with a mono-directional microphone which is intentionally caused to face a different direction from the line extending from the center of the space to the sound source position, and combining them after suitably dividing them in level.

In the above described embodiment, the DMR 66 is used as the recording means. It is also possible to use an analog type tape recorder or a disk recording device of a magnetic type, optical type, electrostatic type or mechanical type. In such a case, a sound recording medium corresponding to the recording means employed can be obtained.

In the above described embodiment, the non-directional microphones 16 to 23 are arranged facing outwardly. They can also be arranged facing inwardly.

What is claimed is:

1. A method of reproducing an acoustic space comprising:

providing, in an acoustic space from which sounds are to be recorded, first sound collection means comprising plural non-directional microphones disposed in a hypothetical three-dimensional space of a sound collection system having a predetermined size, and second sound collection means comprising plural directional microphones of the same number as the non-directional microphones of the first sound collection means disposed concentrically inside of the hypothetical three-dimensional space of the sound collection system, directivity of each of the directional microphones being set in the direction of one of the non-directional microphones with which said directional microphone constitutes a pair;

collecting sounds in the acoustic space by the microphones of the first and second sound collection means;

providing reproduction means comprising loudspeakers of the same number as the non-directional microphones of the first sound collection means disposed in positions corresponding to the non-directional microphones in a three-dimensional space of a reproduction system which is proportional in size to the hypothetical three-dimensional space defined by the first sound collection means;

mixing a sound collection signal from each of the non-directional microphones of the first sound collection means with a sound collection signal from one of the directional microphones of the second sound collection means with which said non-directional microphone of the first sound collection means constitutes a pair; and reproducing the mixed signal from one of the loudspeakers corresponding to said non-directional microphone.

2. A method of reproducing an acoustic space as defined in claim 1 wherein said non-directional microphones of the first sound collection means are installed facing outwardly of the three-dimensional space of the sound collection system.

3. A method of reproducing an acoustic space as defined in claim 1 wherein said three-dimensional space of the sound collection system is a cube and said non-directional microphones of the first sound collection means are disposed at respective corners of said cube.

4. A method of reproducing an acoustic space as defined in claim 1 wherein the scale of the three-dimensional space of the reproduction system is equal to or larger than that of the three-dimensional space of the sound collection system.

5. A method of reproducing an acoustic space as defined in claim 1 further comprising provision of a mono-directional microphone outside of the three-dimensional space of the sound collection system for collecting a spot sound simultaneously with recording of the spot sound by said non-directional and directional microphones.

6. A sound recording device comprising:

first sound collection means comprising plural non-directional microphones disposed in a hypothetical three-dimensional space of a sound collection system having a predetermined size;

second sound collection means comprising plural directional microphones of the same number as the non-directional microphones of the first sound collection means disposed concentrically inside of the hypothetical three-dimensional space of the sound collection system, directivity of each of the directional microphones being set in the direction of one of the non-directional microphones with which said directional microphone constitutes a pair;

mixing means for mixing a sound collection signal from each of the non-directional microphones of the first sound collection means with a sound collection signal from one of the directional microphones of the second sound collection means with which said non-directional microphone of the first sound collection means constitutes a pair; and recording means for recording the mixed signal.

7. A sound recording device as defined in claim 6 wherein said non-directional microphones of the first sound collection means are installed facing outwardly of the three-dimensional space of the sound collection system.

8. A sound recording device as defined in claim 6 wherein said three-dimensional space of the sound collection system is a cube and said non-directional microphones of the first sound collection means are disposed at respective corners of said cube.

9. A sound recording device as defined in claim 6 further comprising a mono-directional microphone provided outside of the three-dimensional space of the sound collection system for collecting a spot sound simultaneously with recording of the spot sound by said non-directional and directional microphones.

10. A sound recording device as defined in claim 6 wherein said recording means is a digital multi-track tape recorder.

11. A sound recording medium in which sound signals are recorded on multiple tracks, said sound signals being obtained by:

collecting sounds to be recorded from an acoustic space by respective microphones of first sound collection means comprising plural non-directional microphones disposed in a hypothetical three-dimensional space of a sound collection system having a predetermined size, and second sound collection means comprising plural directional microphones of the same number as the non-directional microphones of the first sound collection means disposed concentrically inside of the hypothetical three-dimensional space of the sound collection system, directivity of each of the directional microphones being set in the direction of one of the non-directional microphones with which said directional microphone constitutes a pair; and mixing a sound collection signal from each of the non-directional microphones of the first sound collection means with a sound collection signal from one of the directional microphones of the second sound collection means with which said non-directional microphone of the first sound collection means constitutes a pair.

* * * * *